United States Patent [19]
Koenig et al.

[11] 3,818,417
[45] June 18, 1974

[54] PHASE COLLECTOR ASSEMBLY FOR MULTIPLE RUN BUSWAY

[75] Inventors: Martin F. Koenig, Milwaukee, Wis.; Manuel Issa, deceased, late of Fox Point, Wis.; Patrick T. Sheedy, administrator, Fox Point, Wis.

[73] Assignee: Cutler-Hammer Inc., Milwaukee, Wis.

[22] Filed: Nov. 6, 1972

[21] Appl. No.: 304,073

[52] U.S. Cl. ............. 339/22 B, 174/88 B, 174/68 B
[51] Int. Cl. .............................................. H01r 7/08
[58] Field of Search ..... 174/88 B, 99 B, 70 B, 71 B, 174/72 B, 68 B, 16 B; 339/22 B, 205

[56] References Cited
UNITED STATES PATENTS

| | | | |
|---|---|---|---|
| 3,170,747 | 2/1965 | Herrmann et al. | 174/88 B X |
| 3,388,209 | 6/1968 | King et al. | 174/88 B X |
| 3,710,302 | 1/1973 | Shannon et al. | 174/99 B X |

*Primary Examiner*—Darrell L. Clay

[57] ABSTRACT

Respective bus bars of adjacent plug-in bus duct sections of a multiple busway are electrically interconnected by a removable unitary phase collector assembly which includes a plurality of stacked insulator blocks and a plurality double-ended stab connectors interposed adjacent pairs of the insulator blocks. The opposite ends of the collector assembly are inserted through transversely aligned access openings in the duct sections and the jaws on the ends of the stab connector engage and electrically interconnect respective bus bars. Preferably, the number of stab connectors corresponds to the number of bus bars in the duct sections so that all the bus bars can be simultaneously interconnected in a one-step installation operation. The duct sections are mechanically joined by a plurality of fasteners connecting adjacent side walls together.

8 Claims, 3 Drawing Figures

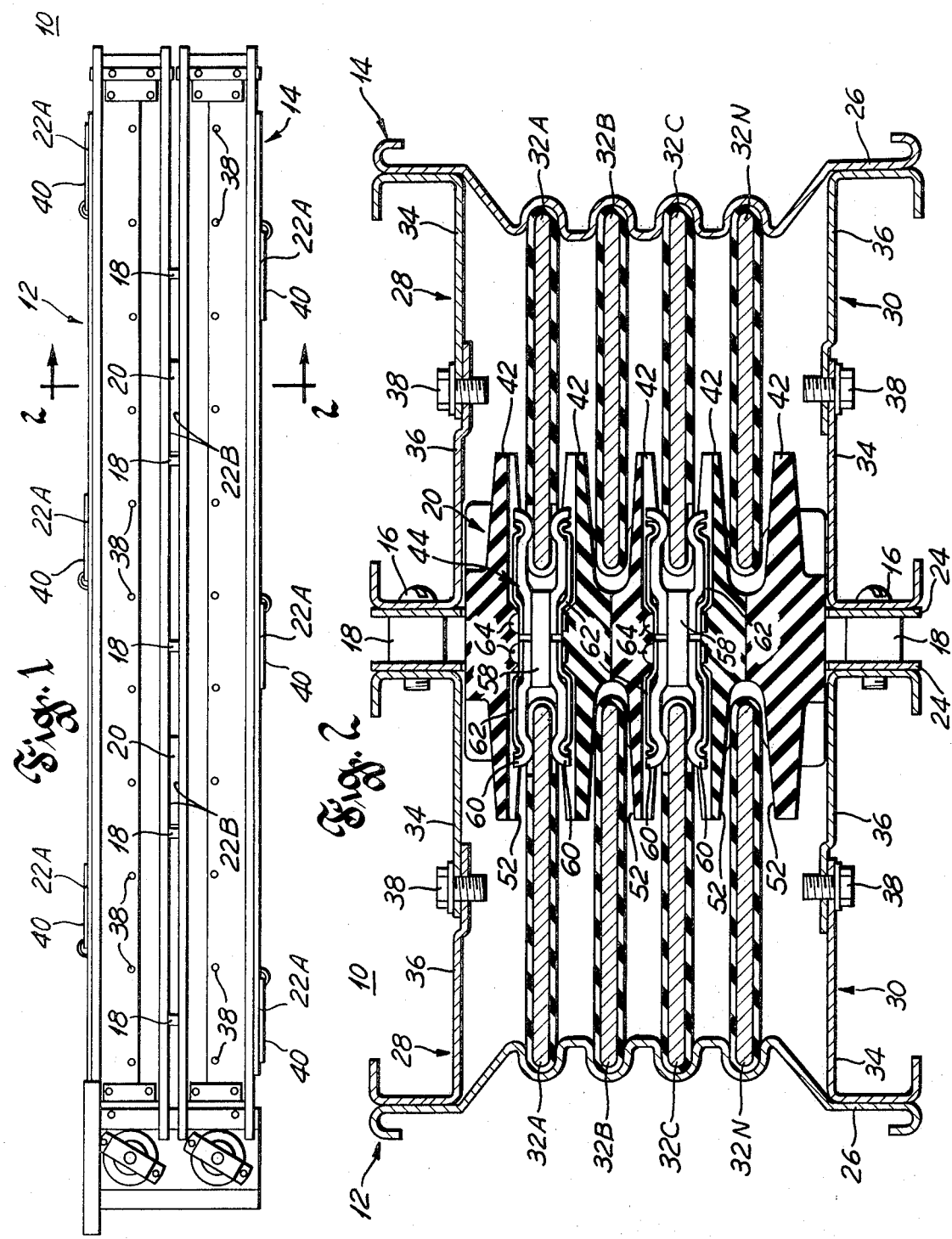

PHASE COLLECTOR ASSEMBLY FOR MULTIPLE RUN BUSWAY

BACKGROUND OF THE INVENTION

This invention relates to electrical busway systems and, more particularly, to a phase collector assembly for electrically interconnecting the bus bars of adjacent bus ducts of a multiple-run busway system.

Electrical busway systems employing multiple parallel bus duct runs, with the bus bars for each individual phase of adjacent bus ducts connected in parallel, are widely used for high current transmission applications which exceed the current carrying capabilities of the individual bus ducts. Such interconnection is usually made in each section or length of bus duct, particularly where the bus ducts are of the plug-in type, since an unbalance of current can occur where more power tap-off devices are plugged into one of the bus ducts than to the other. U.S. Pat. No. 3,384,855 discloses the use of a through-bolt joint connector for effecting this connection near the midpoint of the bus duct section. Where it can be anticipated that all or nearly all of the power tap-off devices will be plugged into the same one of the bus ducts, it may be desirable to employ two such connections per section of bus duct.

Multiple run bus duct sections are typically assembled together at the factory and shipped as assembled units. In order to minimize fabrication and assembly costs, the means used for interconnecting the bus bars desirably should be adaptable to the plug-in openings of existing plug-in bus ducts. Structural modification of existing duct sections is thereby eliminated and assembly is simplified. As mentioned above, U.S. Pat. No. 3,384,855 discloses the use of a through-bolt connector for interconnecting the bus bars of adjacent duct sections. In addition to being quite expensive to fabricate, the loosely stacked components of the connectors usually require careful installation steps to insure all the bus bars are properly interconnected. Consequently, considerable assembly time is required. Also, because of the relatively bulky size of the connector assembly, the assembled adjacent duct sections are spaced some distance apart, requiring added space for transportation, storage and installation.

U.S. Pat. No. 3,170,747 discloses a connector arrangement for electrically interconnecting individual bus bars. Contact fingers on either end are inserted through small openings in the bus bar insulation. When all the bus bars of adjacent duct sections are to be interconnected, one end of the individual connectors is first installed to each of the bus bars of one duct section. The other duct section is then moved into place and aligned with the connectors so that the contact fingers of the other end of the connectors can be inserted through the small openings in the insulating of corresponding bus bars. This alignment procedure can be quite tedious and time consuming, especially when the adjacent duct sections are being interconnected at two or more points.

SUMMARY OF THE INVENTION

The primary object of this invention is to provide a phase collector assembly which is arranged so that a plurality of bus bars of adjacent duct sections of a multiple run busway can be easily and quickly connected together in electrical parallel.

Another object of this invention is to provide such a phase collector assembly which is adaptable to the plug-in openings of existing plug-in bus ducts.

Other objects and advantages of this invention will become apparent upon reviewing the following detailed description, the drawings and appended claims.

According to this invention, a phase collector is provided which includes a plurality of insulator blocks arranged in a stacked relationship to form a unitary assembly having opposite ends adapted to fit through transversely aligned access openings in the side walls of adjacent bus duct sections of a multiple run busway. Double ended, electrically conductive means interposed adjacent insulator blocks are arranged so that, when the opposite ends of the unitary assembly are inserted through respective access openings of the duct sections, the opposite ends of the connector means releasably engage the edge portions of and electrically interconnect respective bus bars on the duct sections. The connector means are clamped in place between adjacent pairs of the insulator blocks.

The connector means can be double-ended stab connectors and preferably are the same in number as the number of bus bars in the duct sections so that all the bus bars can be simultaneously interconnected upon installation of the phase collector assembly.

BRIEF DESCRIPTION OF THE DRAWINGS

FIG. 1 is a top plan view of two plug-in bus duct sections connected together in electrical parallel at two points by phase collector assemblies constructed in accordance with this invention.

FIG. 2 is a sectional view taken along the plane designated 2—2 in FIG. 1.

DESCRIPTION OF THE PREFERRED EMBODIMENTS

Figure 3:
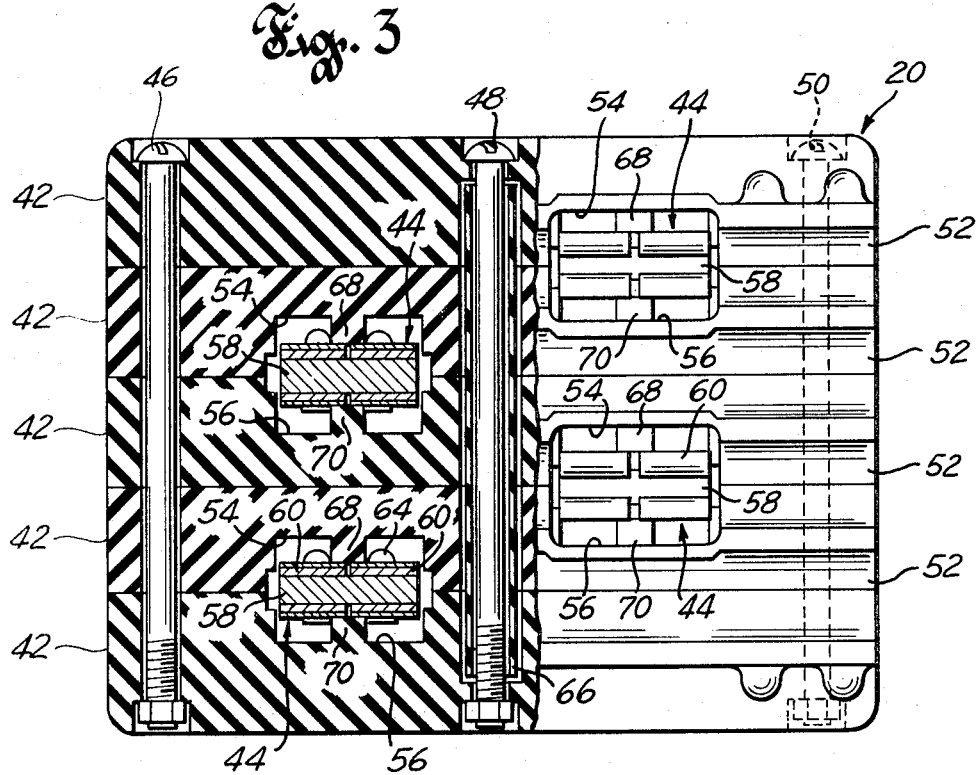
FIG. 3 is a front plan view, partially broken away, of a phase collector assembly constructed in accordance with this invention.

Referring to FIGS. 1 and 2, the multiple run busway assembly 10 includes adjacent plug-in bus duct sections 12, 14 which are mechanically joined together at longitudinally spaced intervals by bolts 16 and spacers 18 and are electrically interconnected at two points by phase collector assemblies 20 which are constructed in accordance with this invention.

Plug-in bus duct sections 12, 14 which are identically constructed and arranged in a conventional manner, are provided with a plurality of access openings 22A and 22B longitudinally spaced along the opposite sides thereof in a staggered relationship to accommodate the installation of plug-in units (not shown).

U.S. Pat. No. 3,710,300, issued on Jan. 9, 1973 and assigned to the assignee of the present invention, describes an exemplary and preferred arrangement for the plug-in bus duct sections. As disclosed in that application, each plug-in bus duct includes a metallic housing having elongated side members 24, 26 which are joined to a pair of opposing lateral members 28, 30 to define an elongated, rectangular chamber. This chamber contains a plurality of flat bus bars 32A, 32B, 32C and 32N, which are insulated in a conventional manner.

Side members 24, 26 are formed with a plurality of oppositely disposed and transversely aligned corrugations which serve to firmly support the opposite edges of the bus bars in spaced relationship. Lateral members 28, 30 have overlapping individual members 34, 36 which are secured at their outer edges to their respective side members, such as by welding, and are secured together at their inner edges at longitudinally spaced intervals by a plurality of screws 38. Screws 38 extend through openings in member 34 and are threaded into member 36. The openings in member 34 are preferably slotted so that member 34 can be moved inwardly relative to member 36. This adjustment feature facilitates assembly of the housing with good lateral contact between the corrugations and the edges of the bus bars, thereby insuring maximum heat dissipation.

Access openings 22A, 22B, are provided in each side member 26, 24 respectively. When plug-in bus ducts 12, 14 are used in normal single run installations, each of the access openings is normally covered by a door 40 hinged to the respective side member. Also, the bus bars are normally supported at each access opening by an insulator block (not shown), such as disclosed in U.S. patent application Ser. No. 237,740 filed March 24, 1972 and assigned to the assignee of the present invention. Such insulator blocks have a plurality of spaced grooves receiving the edges of the bus bars and a plurality of plug-in openings, each of which communicate with a respective bus bar and are adapted to receive the plug-in connectors of a tap-in unit.

As shown in FIGS. 1 and 2, plug-in bus duct sections 12, 14 are positioned adjacent to each other so that access openings 22B are transversely aligned. The doors and the insulator blocks normally used at each of the access openings are omitted for access openings 22B. In accordance with this invention, a unitary or modular, removable phase collector assembly 20 is installed through the adjacent access openings to interconnect the bus bars of duct sections 12, 14 in electrical parallel.

Each phase collector assembly 20 includes a stack of a plurality of insulator blocks 42, preferably made from a molded plastic material, and a plurality of double-ended stab connectors 44 clamped between adjacent insulator blocks. The stack of insulator blocks 42 is held together by bolts 46, 48 and 50 extending therethrough to form a unitary assembly. Insulator blocks 42 are arranged so that the thus-assembled unit will fit through respective access openings 22B in duct section 12, 14. As shown in FIGS. 2 and 3, phase collector assembly 20 preferably includes a stab connector 44 for each bus bar in duct sections 12, 14 so that all the bus bars are simultaneously interconnected when the assembly is installed as described below.

Adjacent insulator blocks 42 are provided with complementary recesses on the opposite ends which cooperate to define a plurality of vertically spaced, horizontal grooves 52 for accommodating the edge portions of the bus bars. Adjacent insulator blocks 42 are also provided with complementary recesses 54, 56 which cooperate to define elongated, transversely extending openings in which stab connectors 44 are disposed.

Stab connectors 44 are conventionally arranged and include a conductive spacer member 58 with two pairs of vertically spaced, spring contact members 60 and back-up spring member 62 mounted on the opposite ends of spacer 58 in a suitable manner, such as by rivets 64. The outer ends of contact members 60 extend into respective grooves 52 and the jaws formed thereby embrace the edge portions of respective bus bars to electrically interconnect them, when phase collector assembly 20 is installed as described below.

As shown in FIG. 3, recesses 54, 56 are preferably arranged so that connectors 44 are in a vertically staggered relationship in order to obtain maximum over-the-surface insulation between the bus bars. Also, bolt 48 is surrounded by an insulative sleeve 66, which fits inside a central aperture provided in each insulator block 42, to provide the required over-the-surface insulation between the bus bars.

Connectors 44 are held in place by the clamping action provided by oppositely disposed, vertical ribs 68, 70 centrally located in recesses 54 and 56, respectively. As shown in FIG. 3, rivets 64 are preferably located so that their heads and peened over portions snugly engage the opposite edges of ribs 68, 70 to retain connector 44 against lateral movement.

To electrically interconnect bus duct sections 12, 14, one end of phase collector assembly 20 is first installed onto the edges of the bus bars of one of the duct sections by inserting through access opening 22B. Stab connectors 44 and recesses 52 are symmetrically arranged so that no particular attention of the orientation of the phase collector assemblies is required during installation, i.e. it can be installed in the position shown in FIG. 3 or rotated 180°. The duct sections are then moved together, with the respective access openings 22B aligned, and the other end of the phase collector assemblies is inserted through the respective access opening and the stab connectors are installed onto the edges of the respective bus bars of the other duct section. The duct sections are then mechanically held together by installing spacers 18 and bolts 16 between adjacent side members 24.

It can be appreciated that the insulation blocks of phase collector assembly 20 can be compactly arranged so that the spacing between the assembled, adjacent duct sections is relatively small. The duct sections can be easily disconnected by simply removing bolts 16 and moving the duct sections apart to disconnect one or both ends of the phase collector assembly from the bus bars. If the phase collector remains connected to the bus bars at one end, it can be easily and quickly disconnected as a unit without further disassembly.

From the above detailed description, it can be seen that the simply designed phase collector assembly of this invention provides an effective means for electrically interconnecting adjacent plug-in bus ducts of a multiple run busway without requiring modification to the existing construction. The unitary assembly can be easily and quickly connected to or disconnected from all the bus bars of the adjacent bus duct section, thereby facilitating an expediting assembly and disassembly. Also, the phase collector assembly can be compactly arranged so there is a minimum spacing between the assembled bus duct sections, thereby reducing space required for storage, transportation or installation.

Upon reading the above detailed description of this invention it will readily be apparent to those skilled in the art that various modifications and alterations can be made thereto without departing from the spirit and scope of the invention.

We claim:
1. In combination, first and second bus ducts, each bus duct including a housing having elongated side walls, a plurality of generally flat, spaced bus bars disposed within said housing and having edge portions adjacent said housing side walls, and an access opening in one of said housing side walls exposing an edge portion of said bus bars, said first and second bus ducts being located adjacent to each other in closely spaced relationship with the access opening thereof being transversely aligned; and a unitary phase collector assembly removably connecting the bus bars of said first bus duct in electrical parallel with the bus bars of said second bus duct, said phase collector assembly including a plurality of insulator blocks arranged in vertically stacked relationship and having opposite end portions extending through respective access openings of said first and second bus ducts, a plurality of transversely extending connector members corresponding in number to the number of said bus bars in each of said first and second bus duct, each of said connector members being interposed between adjacent pairs of said insulator blocks and having on one end a contact member embracing and releasably engaging the edge portion of a bus bar in said first bus duct and on the opposite end a contact member embracing and releasably engaging the edge portion of a bus bar in said second bus duct to thereby electrically interconnect these bus bars, and means for holding said insulator blocks and said connector members together in clamped relationship.

2. The combination according to claim 1 wherein said holding means includes at least one bolt means extending through the stacked insulator blocks.

3. A combination according to claim 1 including means for mechanically joining said first and second bus ducts together.

4. The combination according to claim 1 wherein adjacent pairs of said insulator blocks include complementary first recesses on the opposite ends thereof, said first recesses cooperating to define coplanar horizontal grooves receiving the edge portion of respective bus bars of said first and second bus ducts, and each of said contact members include bus bar embracing jaws which extend into respective of said grooves and releasably embrace the edge portion of a respective bus bar of said first and second bus ducts.

5. A combination according to claim 4 wherein said connector members are arranged in a vertically staggered relationship.

6. A combination according to claim 4 wherein adjacent pairs of said insulator blocks include complementary second recesses extending horizontally between and connecting said first recesses, said second recesses cooperating to define a transversely extending opening for receiving a connector member and a transversely extending rib in each of said second recesses, said ribs clampingly engaging the opposite sides of the connector member located in said opening.

7. A combination according to claim 6 including retaining means on said connector member engaging the opposite sides of one of said ribs to thereby restrain lateral movement of said connector member with respect to said rib.

8. A combination according to claim 7 wherein said connector member includes a transversely extending, electrically conductive spacer member clamped between the ribs of adjacent insulator blocks;

each of said jaws being formed by a pair of vertically spaced, electrically conductive spring members; and means for fastening a pair of said spring members to each of the opposite ends of said spacer member, said fastening means being arranged to also act as said retainer means.

* * * * *